US006768566B2

(12) United States Patent
Walker

(10) Patent No.: US 6,768,566 B2
(45) Date of Patent: Jul. 27, 2004

(54) PROJECTION SCREEN APPARATUS INCLUDING HOLOGRAPHIC OPTICAL ELEMENT

(75) Inventor: Dale S. Walker, Houston, TX (US)

(73) Assignee: Duke University, Durham, NC (US)

(*) Notice: Subject to any disclaimer, the term of this patent is extended or adjusted under 35 U.S.C. 154(b) by 91 days.

(21) Appl. No.: 10/122,138

(22) Filed: Apr. 15, 2002

(65) Prior Publication Data

US 2002/0159109 A1 Oct. 31, 2002

Related U.S. Application Data

(63) Continuation of application No. 09/521,236, filed on Apr. 5, 2000, now Pat. No. 6,483,612, which is a continuation of application No. 09/060,906, filed on Apr. 15, 1998, now abandoned.

(51) Int. Cl.[7] .......................... G02B 5/32; G02B 21/56; G02B 21/60
(52) U.S. Cl. ......................... 359/15; 359/453; 359/460
(58) Field of Search ............................... 359/443, 453, 359/456, 460, 1, 15

(56) References Cited

U.S. PATENT DOCUMENTS

| | | | |
|---|---|---|---|
| 4,523,849 A | 6/1985 | Stone | 356/369 |
| 4,773,731 A | 9/1988 | Goldenberg et al. | 359/457 |
| 4,799,137 A | 1/1989 | Aho | 362/309 |
| 4,874,228 A | 10/1989 | Aho et al. | 350/345 |
| 4,961,642 A | 10/1990 | Ogino | 353/38 |
| 4,969,732 A | 11/1990 | Wright et al. | 353/77 |
| 5,054,885 A | 10/1991 | Melby | 359/618 |
| 5,122,905 A | 6/1992 | Wheatley et al. | 359/586 |
| 5,122,906 A | 6/1992 | Wheatley | 359/586 |
| 5,190,370 A | 3/1993 | Miller et al. | 362/340 |
| 5,193,015 A | 3/1993 | Shanks | 359/53 |
| 5,223,869 A | 6/1993 | Yanagi | 353/78 |
| 5,333,072 A | 7/1994 | Willett | 359/41 |
| 5,337,106 A | 8/1994 | Jutamulia et al. | 354/152 |

(List continued on next page.)

FOREIGN PATENT DOCUMENTS

| | | |
|---|---|---|
| AT | 97/03956.4 | 11/1997 |
| EP | 0488 590 A1 | 11/1991 |
| EP | 0 657 769 A1 | 12/1994 |
| EP | 9630 9443 | 4/1997 |
| JP | 3-43932 A | 2/1990 |
| WO | 94/29768 | 12/1994 |
| WO | WO 95/34832 | 12/1995 |
| WO | WO 9727606 | 7/1997 |

OTHER PUBLICATIONS

Joubert, C. et al., "Dispersive Holographic Microlens Matrix For Single LCD Protection", SPIE vol. 2650, p. 243–252 (3/96).

Perfenov, A.V. and Putilin, Andrey, "Advanced Optical Schemes With Liquid Crystal Image Converters For Display Applications" SPIE vol. 2650, pp. 173–179 (Jul. 1996).

(List continued on next page.)

Primary Examiner—Christopher Mahoney
(74) Attorney, Agent, or Firm—Fleshner & Kim, LLP

(57) ABSTRACT

A screen apparatus includes a holographic optical element and a diffuser. The holographic optical element may be constructed using standard techniques known in the field of holography. The holographic optical element may be used to replace a typical Fresnel lens used in projection screen apparatuses. In operation, the holographic optical element receives image light from an image engine or projector and redirects the image light to the diffuser for scattering. The holographic optical element can be designed to substantially collimate, converge, or diverge the image light. The combination of the holographic optical element and the diffuser provides improved illumination uniformity that can be perceived by a viewer as the viewer moves in directions transverse to the screen apparatus. The screen apparatus may be designed to provide improved illumination uniformity to optimized or optimal locations in a viewing region. The screen apparatus may be advantageously employed in display apparatuses.

78 Claims, 8 Drawing Sheets

U.S. PATENT DOCUMENTS

| | | | |
|---|---|---|---|
| 5,381,309 A | 1/1995 | Borchardt | 362/31 |
| 5,404,076 A | 4/1995 | Dolan et al. | 313/572 |
| 5,442,482 A | 8/1995 | Johnson et al. | 359/619 |
| 5,453,859 A | 9/1995 | Sannohe et al. | 359/63 |
| 5,467,154 A | 11/1995 | Gale et al. | 353/119 |
| 5,486,949 A | 1/1996 | Schrenk et al. | 359/498 |
| 5,504,391 A | 4/1996 | Turner et al. | 313/570 |
| 5,557,343 A | 9/1996 | Yamagishi | 348/781 |
| 5,563,738 A | 10/1996 | Vance | 359/614 |
| 5,573,324 A | 11/1996 | DeVann | 353/77 |
| 5,606,220 A | 2/1997 | Dolan et al. | 313/637 |
| 5,612,820 A | 3/1997 | Schrenk et al. | 359/498 |
| 5,615,045 A | 3/1997 | Takuma et al. | 359/456 |
| 5,626,800 A | 5/1997 | Williams et al. | 264/1.38 |
| 5,644,431 A | 7/1997 | Magee | 359/619 |
| 5,661,531 A | 8/1997 | Green et al. | 349/7.3 |
| 5,670,842 A | 9/1997 | Dolan et al. | 313/570 |
| 5,682,080 A | 10/1997 | Dolan et al. | 313/570 |
| 5,686,793 A | 11/1997 | Turner et al. | 313/570 |
| 5,688,064 A | 11/1997 | Shanks | 403/24 |
| 5,692,820 A | 12/1997 | Gale et al. | 359/455 |
| 5,695,895 A | 12/1997 | Johnson et al. | 430/5 |
| 5,796,499 A | 8/1998 | Wenyon | 359/15 |
| 5,877,874 A | 3/1999 | Rosenberg | 359/15 |
| 5,877,893 A | 3/1999 | Kim | 359/456 |
| 5,932,342 A | 8/1999 | Zeira et al. | 428/327 |
| 6,278,546 B1 | 8/2001 | Dubin et al. | 359/456 |
| 6,483,612 B2 * | 11/2002 | Walker | 359/460 |

OTHER PUBLICATIONS

Gambogi, W.J., et al., "Color Holography Using DuPont Holographic Recording Films", SPIE, vol. 2405 pp. 62–73 (1/95).

Armstrong, D. Tipon and Stevenson, S., "Improved Process of Reflection Holography Replication and Heat Processing," SPIE vol. 2176 Practical Holography VIII, pp. 172–183 (1994).

Gambogi, W. et al., "HOE Imaging in DuPont Holographic Photopolymers", SPIE vol. 2152, pp. 282–293. (06/94).

Gambogi, W., et al., "Advances and Applications of DuPont Holographic Photopolymers", SPIE vol. 2043, pp. 2–13 (1993).

Gambogi, W., et al. "Diffractive Printing Methods Using Volume Holograms", IS&T/SPIE 1993, Intl. Conf. on Electronic Imaging Conf.

Gambogi, W.,et al. "Holographic Transmission Elements Using Improved Photopolymer Films", SPIE vol. 1555 Computer and Optically Holographic Optics (Fourth in a Series), pp 256–266 (1991).

Weber, Andrew M., et al. "Hologram Recording in DuPont's New Photopolymer Materials" Practical Holography IV, SPIE OE/Lase Conference Proceedings, (1990).

Weber, Andrew M. et al., "Hologram Recording in DuPont's New Photopolymer Materials", SPIE vol. 1212 Practical Holography IV, pp 30–39 (1990).

* cited by examiner

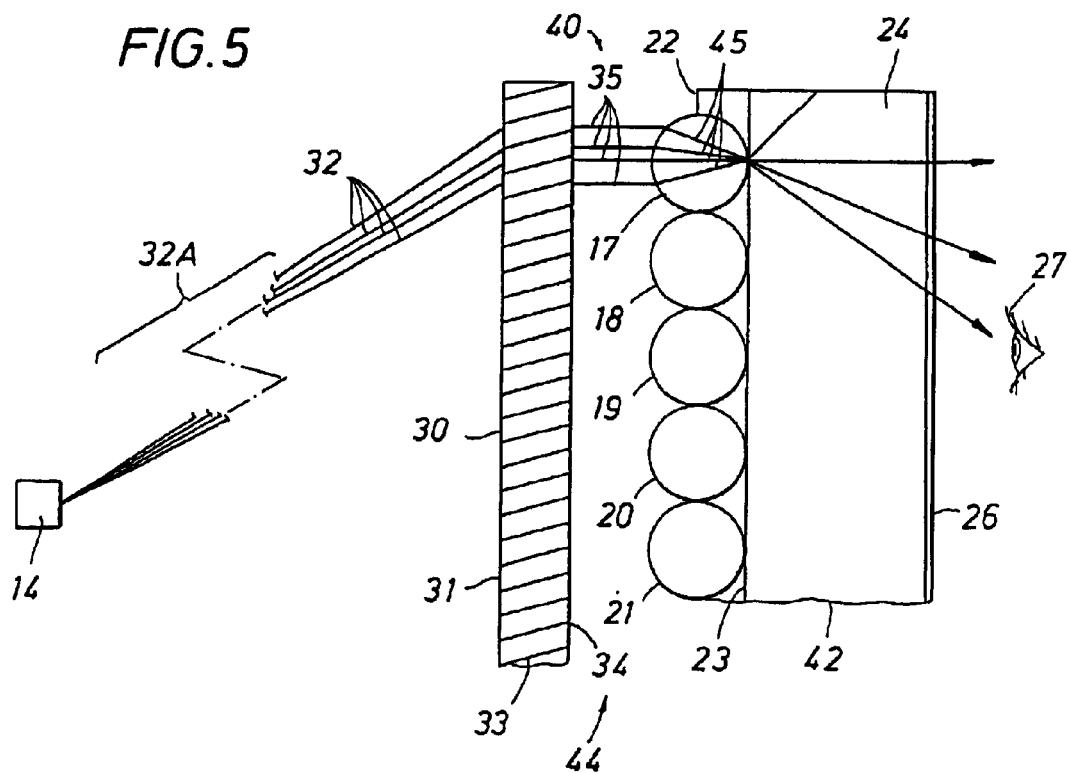
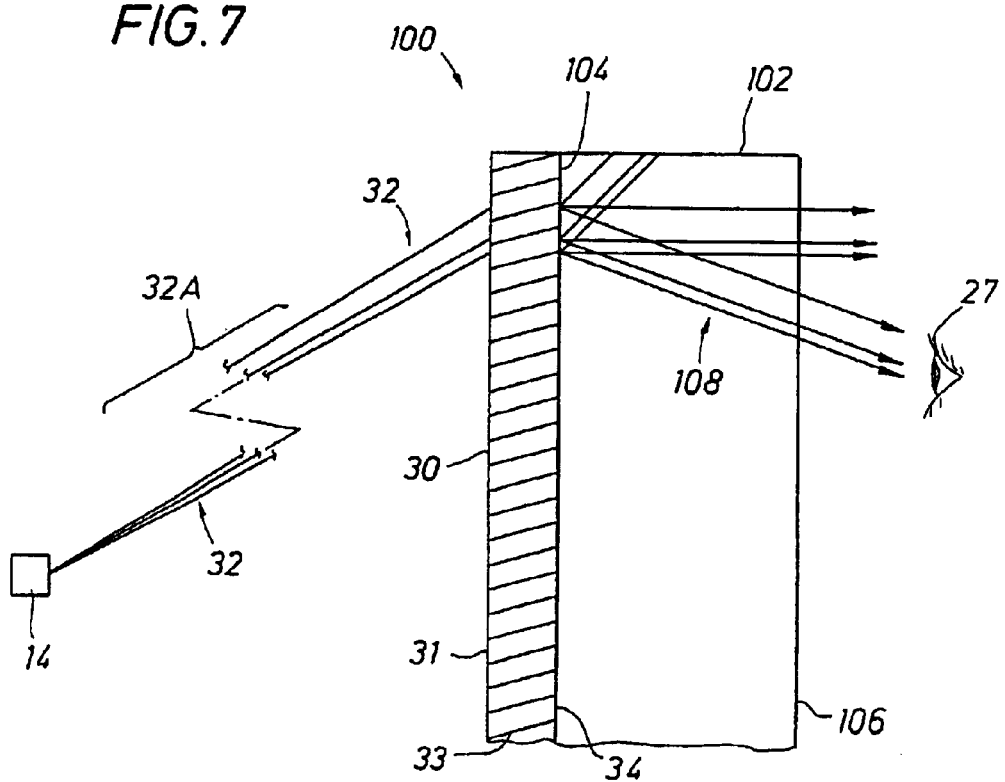

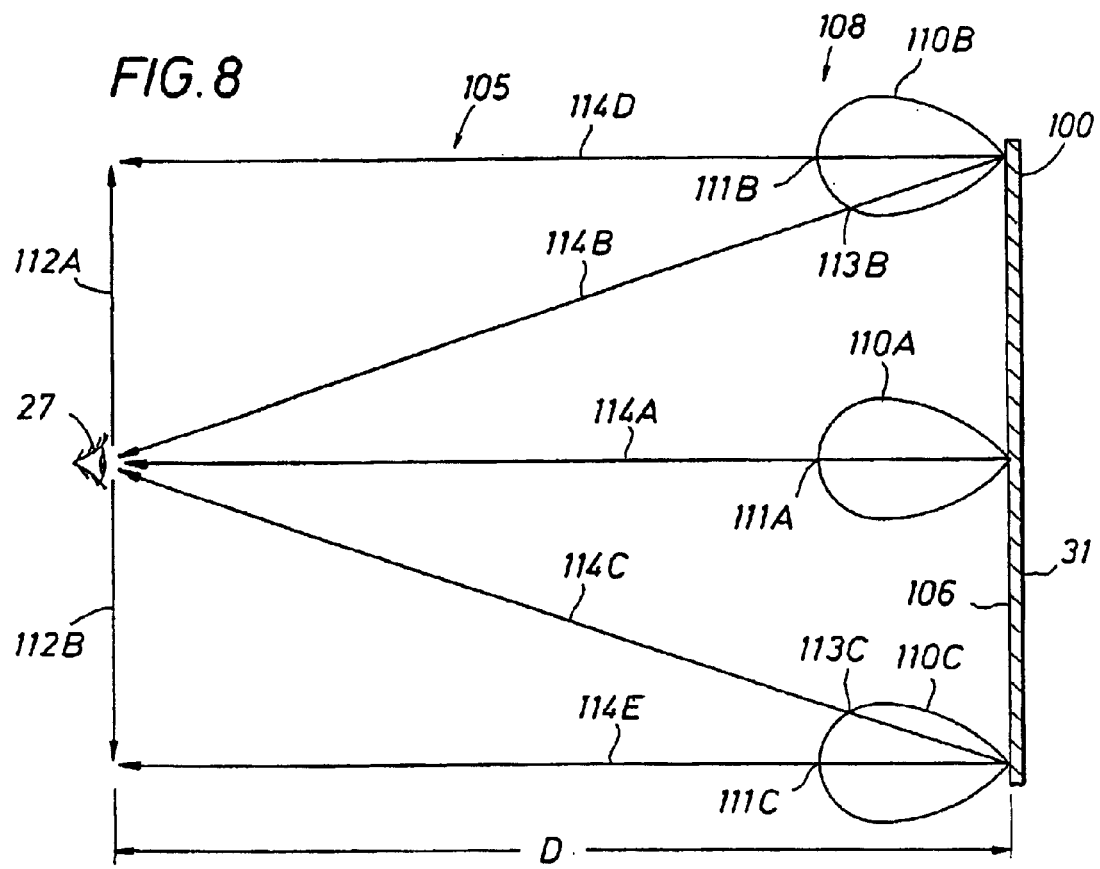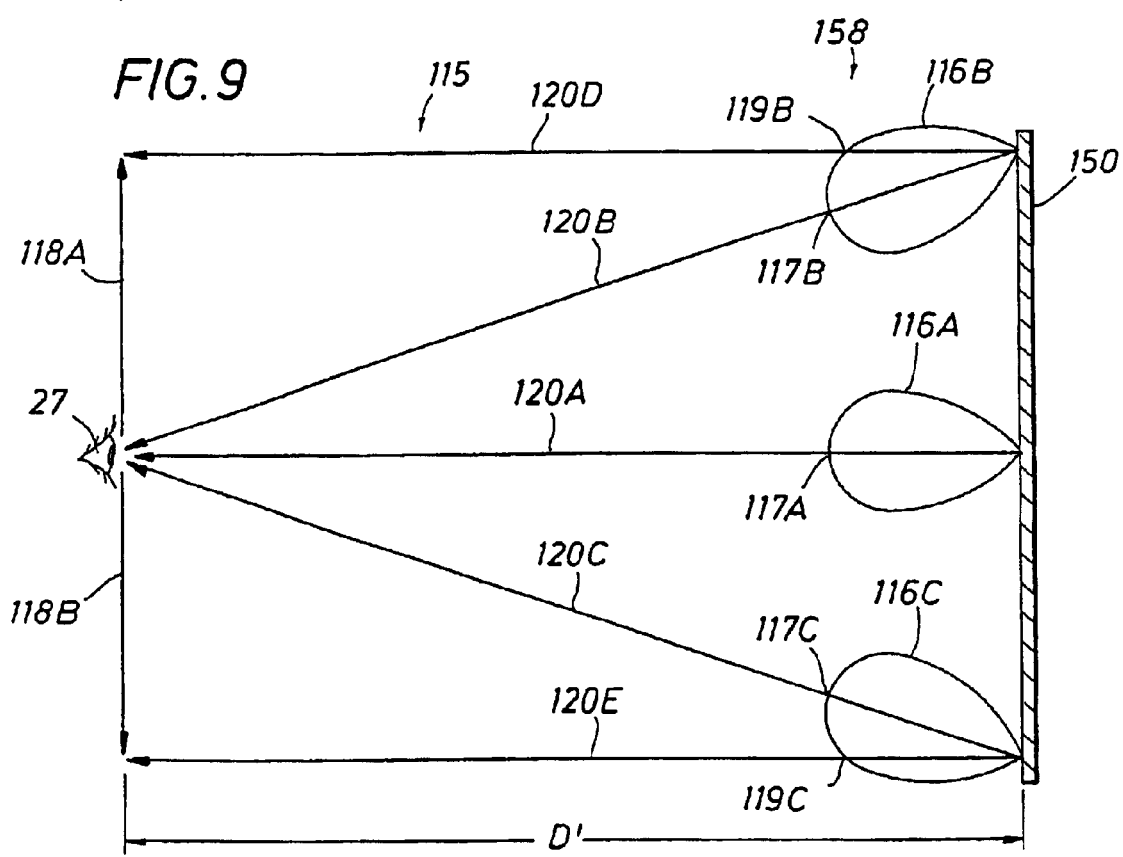

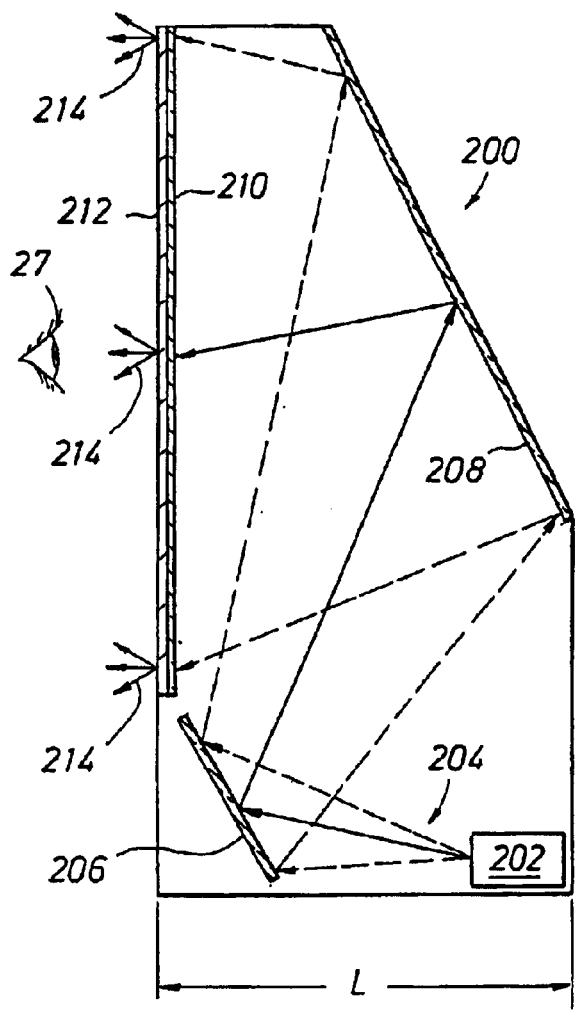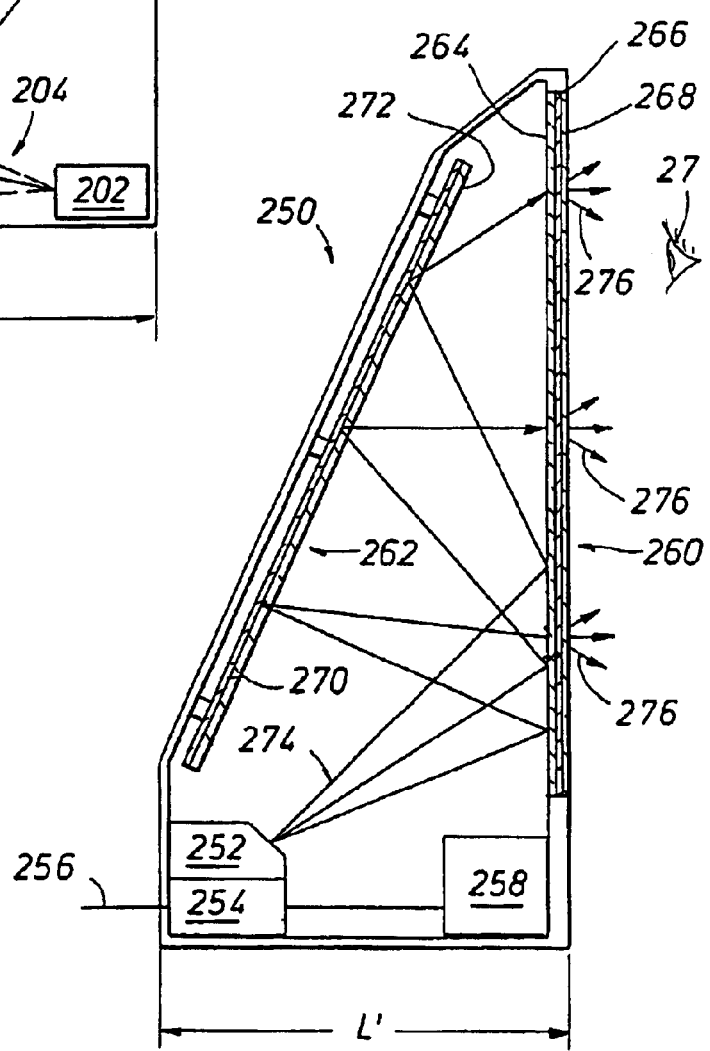
FIG.12
FIG.13

PROJECTION SCREEN APPARATUS INCLUDING HOLOGRAPHIC OPTICAL ELEMENT

This application is a continuation of application Ser. No. 09/521,236 filed Apr. 5, 2000 now U.S. Pat. No. 6,483,612 which is a continuation of Ser. No. 09/060,906 filed Apr. 15, 1998 now abandoned.

BACKGROUND OF THE INVENTION

1. Field of the Invention

The present invention relates to projection systems and projection screens and more particularly, to a projection screen apparatus that provides improved image illumination uniformity.

2. Description of Related Art

Light projection is used to displace images on large surfaces, such as large computer displays or television screens. In front projection systems, an image beam is projected from an image source onto the front side of a reflection-type, angle transforming screen, which then reflects the light toward a viewer positioned in front of the screen. In a rear projection system, the image beam is projected onto the rear side of a transmission-type angle transforming screen and transmitted toward a viewer located in front of the screen.

Referring to FIG. 1, wide angle projection systems that include a screen apparatus 10 are known to optimally use a conventional Fresnel lens 11 in combination with some diffusing element, such as a substrate covered with glass beads (e.g., a type of diffuser or diffusive screen) 12. The combination forms an imaging screen that produces an image. The Fresnel lens 11 and the diffuser 12 are held in relatively rigid or semi-rigid spaced apart relation to assure proper operation of the combination. Such screens, known generally in the art as "black matrix bead" or "BMB" screens, are commercially available from Minnesota Mining & Manufacturing Company and others. Fresnel lenses are sold by Fresnel Optics and are manufactured by Minnesota Mining & Manufacturing Company, for example, as used in devices such as overhead projectors. The Fresnel lens 11 element is constructed to provide the optical properties of a much thicker lens, however, with smaller size and weight. Concentric steps or discontinuities 11A allow these optical and physical properties to be realized. Each of the steps has a curved profile, in cross-section, that exhibits optical power to redirect incident light 13. The cut-out sections that define the steps reduce the overall size and weight.

In FIG. 1, the Fresnel lens 11 receives the incoming light 13 from a projection image engine or image projector 14 (e.g., a liquid crystal display imager, a light source, and a projection lens that produce image light in response to input video or other signals). The break in the light path of the light 13 shown in FIG. 1 is included to recognize that the light 13 may be processed or filtered, for example, projected by the projection or other lens (not shown), and is generally indicated by numeral 13A. The screen apparatus 10 and the image engine 14 are arranged such that a light beam exiting the Fresnel lens 11 is collimated, as shown by parallel rays of light 15. The collimated rays 15 pass across an air gap 16 to a matrix of glass beads 17–21 in the diffuser 12. The glass beads 17–21 are mounted upon an adhesive black mask layer 22 that is on a front surface 23 of a substrate 24 of the diffuser 12. As the collimated light rays 15 strike any of the glass beads 17–21, the rays are focused as light 25 in FIG. 1. The substrate 24 is light transparent so that a viewer 27 can see an image from the light 25 that passes through a surface 26 (e.g., an acrylic, polystyrene, other polymer or like surface) of the screen apparatus 10. The screen apparatus 10 can be an "intelligent" television screen, having a large diagonal dimension, for example, substantially 60 inches, or a computer monitor screen.

For wide angle projection, there are currently no satisfactory methods of collimating light at a display screen. The conventional Fresnel lens 11 may create objectionable shadows and ghosts (i.e., ghost images from light scattered in undesired directions) that degrade the display image. The discontinuities in the Fresnel lens 11 lead to shadows and ghosts being introduced on illumination of the screen apparatus 10. The formation of a ghost image from discontinuous surfaces of a Fresnel lens is schematically illustrated in FIG. 2, and its appearance on the viewing side of a Fresnel lens/diffuser combination screen is schematically illustrated in FIG. 3. For discussion on the disadvantages of such stepped lenses, see *Antenna Theory* by Constantine A. Balanis, Harper and Row, New York, 1982. p. 650 and *Antenna Engineering Handbook*, H. Jasik (ed.) (Chapter 14 by S. B. Cohn), McGraw-Hill, New York, 1961, pp. 14–1 to 14–43. Moreover, the Fresnel lens 11 is also disadvantageous because it may be relatively expensive, easily damaged, have visible rings, and cannot be laminated (e.g., index matched) on both sides. Removing the Fresnel lens 11 and relying only on the diffusive screen 12 itself to achieve uniformity may result in a "hot spot" in the center of the screen and wasted light diffused out of the field of view of the viewer 27. The air gap 16 between the Fresnel lens 11 and the glass beads 17–21 also prevents the screen apparatus 10 from being is compact or as mechanically stable as might otherwise be possible.

The present invention is directed to overcoming or substantially limiting some or all of the above shortcomings of the Fresnel lens/diffuser combination screens, and the occurrence of the hot spot when no Fresnel lens is used.

SUMMARY OF THE INVENTION

In one aspect, the invention features a screen apparatus. The screen apparatus includes a holographic optical element adapted to receive image light and to redirect the image light. The screen apparatus also includes a diffuser adapted to receive the redirected image light from the holographic optical element and to scatter the redirected image light.

BRIEF DESCRIPTION OF THE DRAWINGS

Other objects and advantages of the invention will become apparent upon reading the following detailed description and upon reference to the drawings in which:

FIG. 5 is a side, cross-sectional view of a screen apparatus in accordance with the embodiment in FIG. 4.

FIG. 7 is a side, cross-sectional view of a screen apparatus in accordance with another embodiment of the invention.

FIG. 8 is a plan view of the screen apparatus in FIG. 7 schematically showing image light features in a viewing region.

FIG. 9 is a plan view of a screen apparatus schematically showing image light features in a viewing region in accordance with another embodiment of the invention.

FIG. 12 is a side, cross-sectional view of a display apparatus in accordance with another embodiment of the invention.

FIG. 13 is a side, cross-sectional view of another display apparatus in accordance with another embodiment of the invention.

Figure 1:
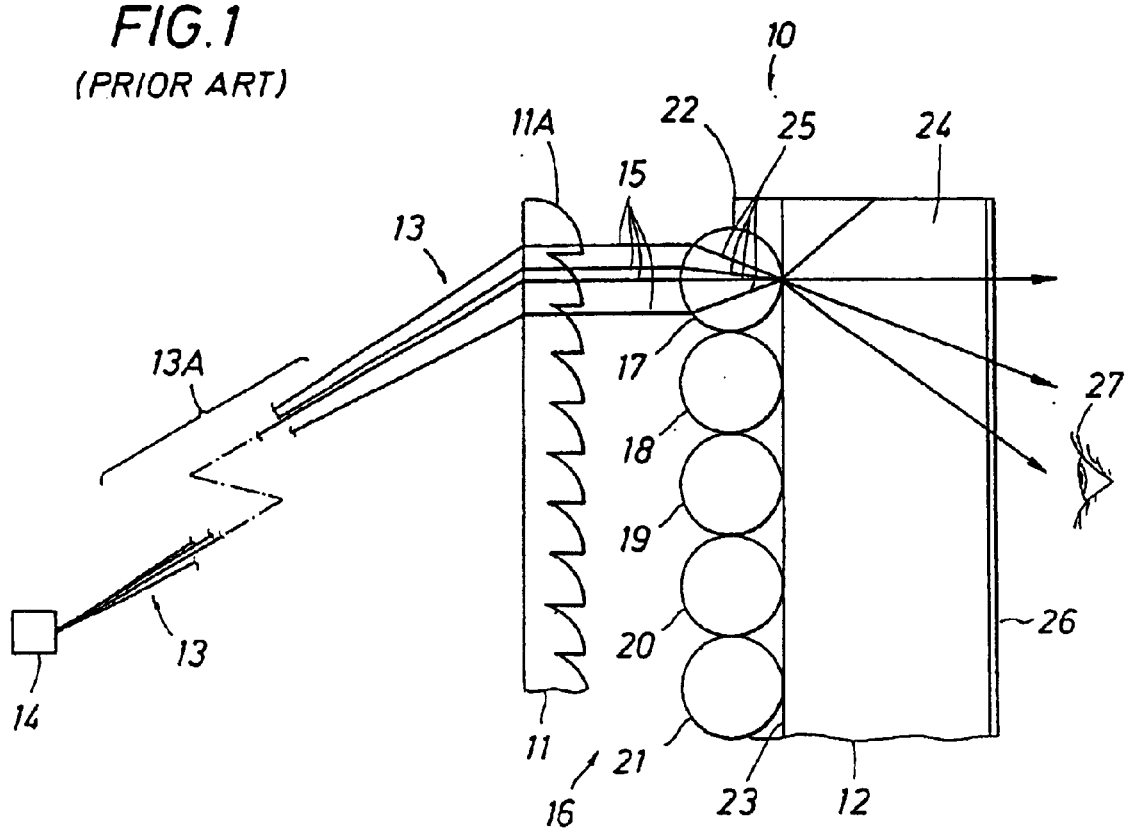
FIG. 1 is a side, cross-sectional view of a prior art BMB projection screen that uses a Fresnel lens in combination with a spaced apart bead-covered diffuser.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 4:
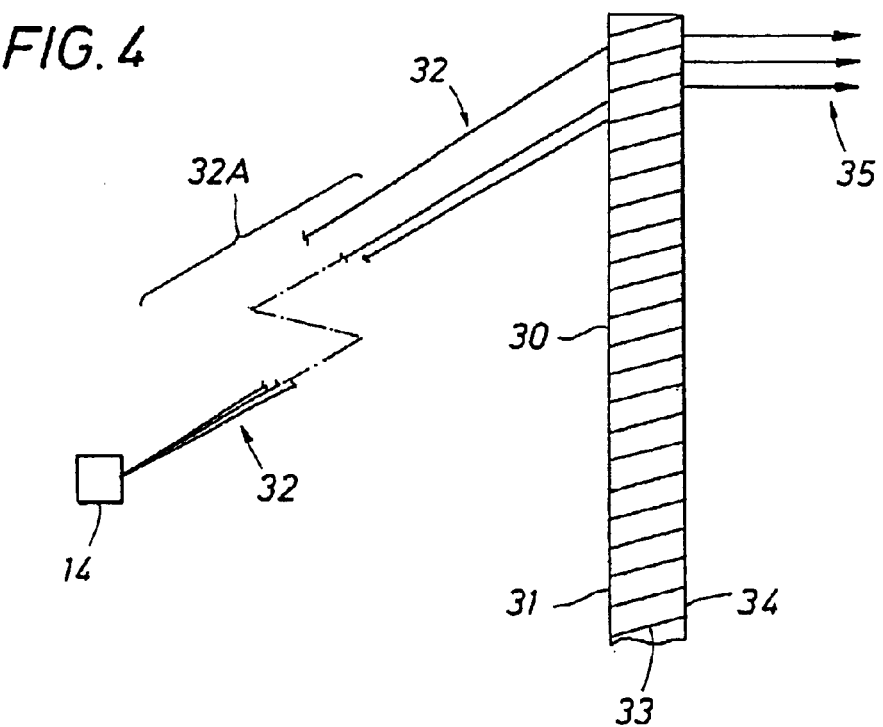
FIG. 4 is a side, cross-sectional view of a holographic optical element collimating light in accordance with an embodiment of the invention.
Figure 2:
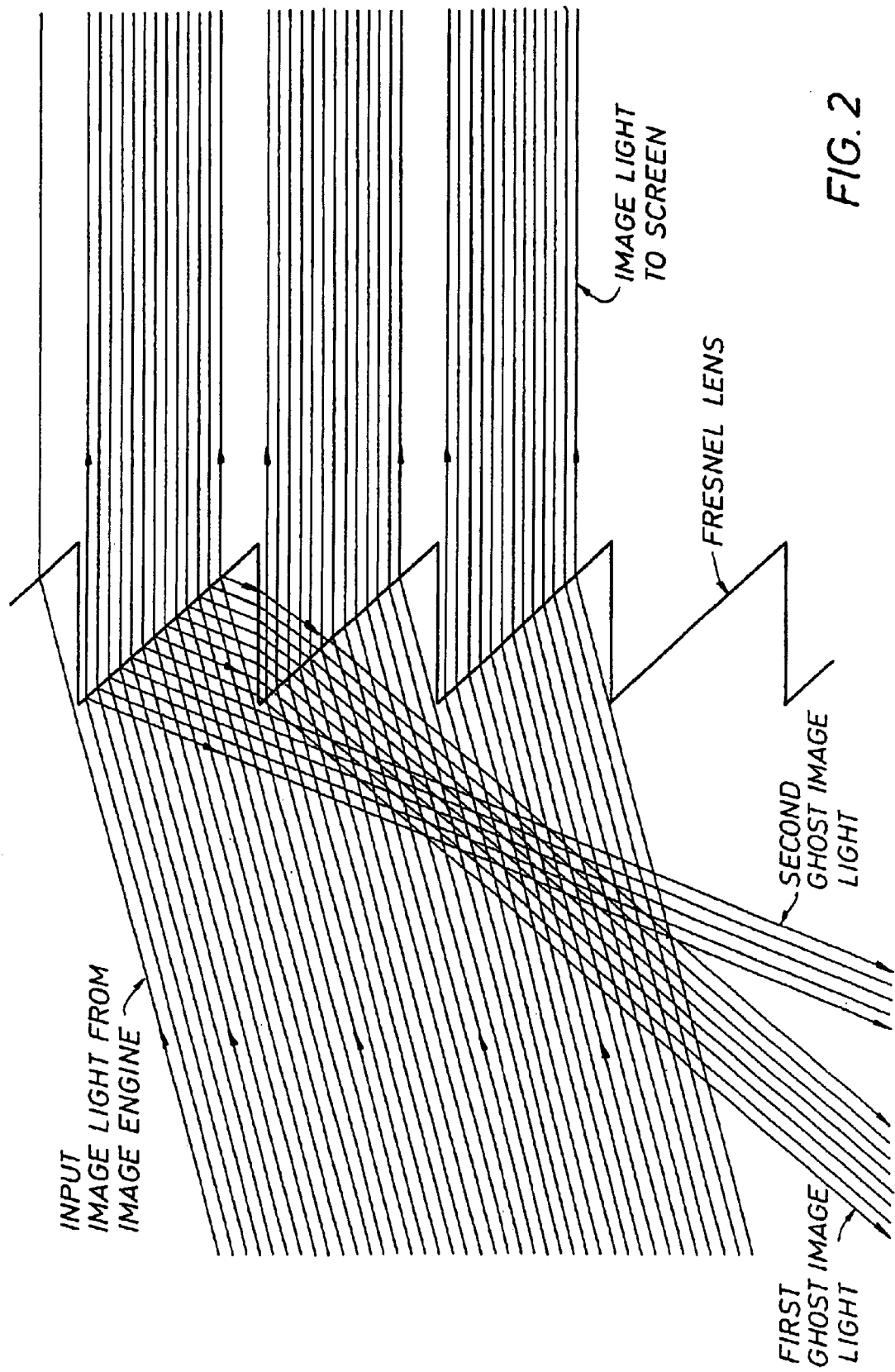
FIG. 2 is a schematic illustration of the formation of ghost image light from a Fresnel lens.
Figure 3:
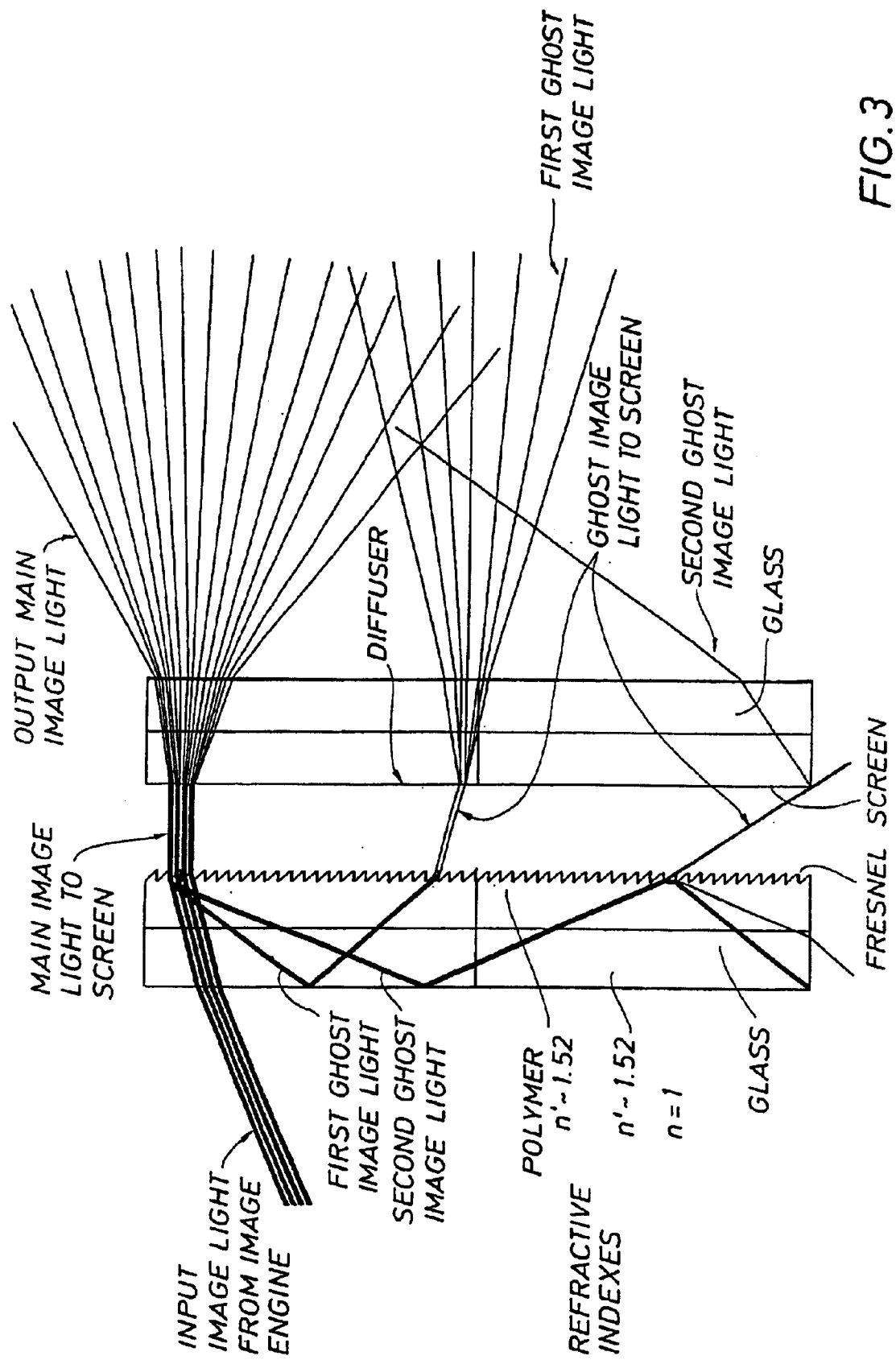
FIG. 3 is a schematic illustration of ghost image light appearing on the viewing side of a Fresnel lens/diffuser combination screen.

The present invention relates to an improved screen apparatus, for example, a projection screen, that may be employed in a front or rear protection system, such as a television, or in a computer monitor. Referring to FIGS. 4 and 5, a holographic optical element (HOE) 30 is included in a screen apparatus 40 (FIG. 5) in accordance with a first embodiment of the invention. The HOE 30 may be used to replace the Fresnel lens 11 discussed above, performs a similar function as the Fresnel lens 11, but has distinct advantages that will be described below. The HOE 30 is recorded and processed (e.g., developed and possibly baked) to substantially collimate incoming image light 32 received from the image engine 14. Baking may be required for certain HOE (e.g., photopolymer) materials used to make the HOE 30, such as some materials that can be obtained from DuPont. Other types of HOE materials used to make the HOE 30, such as those for making surface relief, surface kineform, or embossed HOEs, may employ other methods that do not include baking. The image engine 14 may be similar to image engines described in prior, co-owned U.S. patent application Ser. No. 08/730,818, filed Oct. 17, 1996, by Richard M. Knox, entitled "Image Projection System Engine Assembly," which is incorporated by reference herein in its entirety. The image light 32 is similar to the image light 13 in FIG. 1, with a break labeled 32A in the light path being analogous to the break 13A in FIG. 1. For example, the light 32 may be processed or projected by a projection or other lens (not shown) to the HOE 30, as generally indicated by the numeral 32A. The incoming image light 32 may be diverging as it strikes the HOE 30. The light 32 passes through an input surface 31 and then an output surface 34 of the HOE 30 as substantially collimated light 35. The surfaces 31, 34 form a pair of opposed surfaces.

Figure 6:
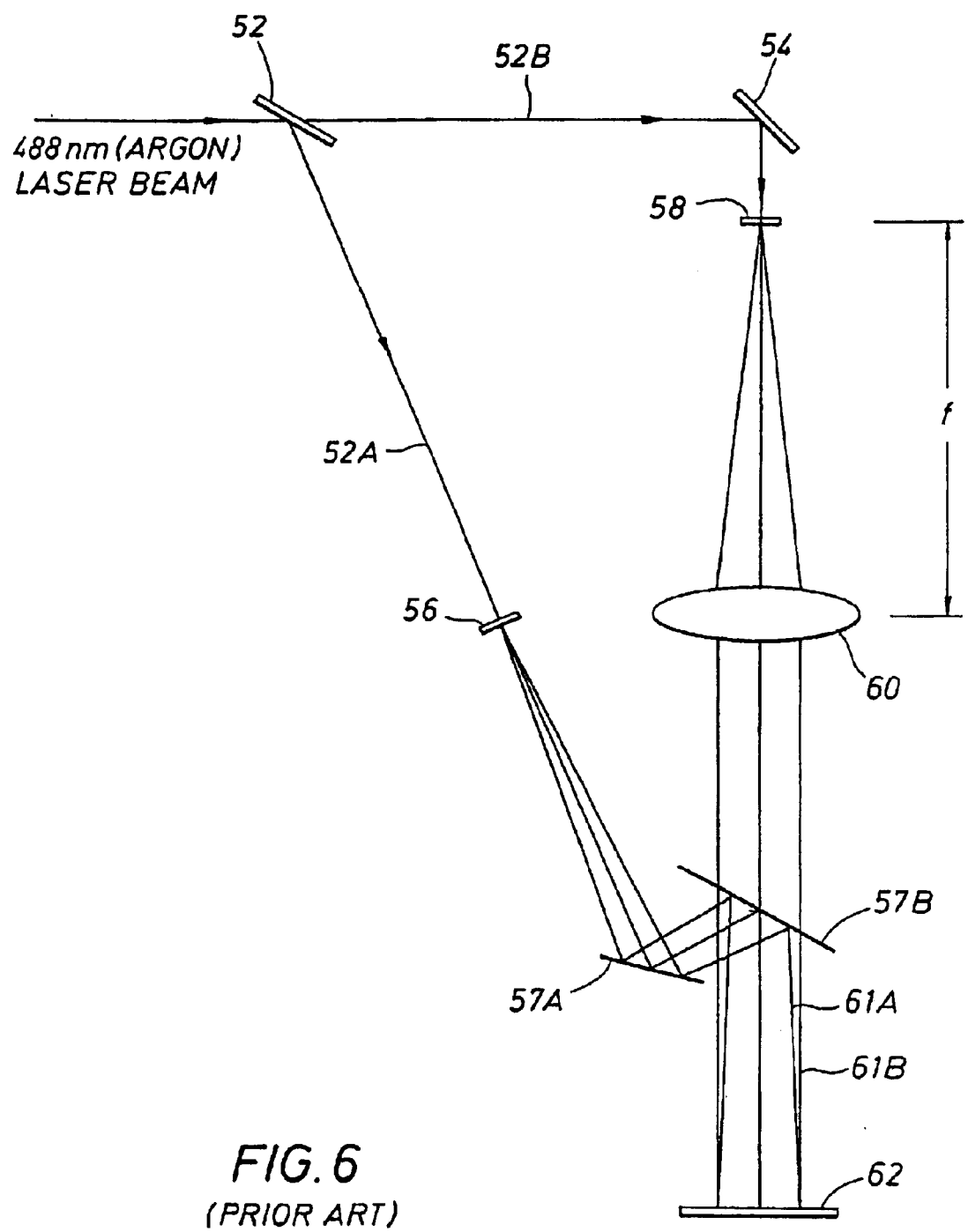
FIG. 6 is a plan view of a prior art system for forming a holographic optical element.

The HOE 30 may be formed using standard reference and object beam interference techniques known in the field of holography. One possible optical setup among many other possible setups that may be used to form the HOE 30 is depicted in FIG. 6, as will be appreciated by those skilled in the art. Light from a coherent light source (not shown), for example, an argon laser is split by a variable beamsplitter 52 into two beams. One branch 52A of the split light passes through a first spatial filter 56 and another branch 52B is redirected by a reflector or mirror 54 through a second spatial filter 58. The light in the branch 52A passing through the spatial filter 56 is known in the art as the "reference" beam and the light in the branch 52B passing through the spatial filter 58 is known as the "object" beam. Such terms as reference and object would be considered somewhat arbitrary in other implementations that may be used to record holograms, as will be appreciated by those skilled in the art. The spatial filters 56, 58 produce substantially uniform light intensity in a transverse direction across their output. The reference and object beams 52A, 52B both diverge after passing through the spatial filters 56, 58. The light from the spatial filter 56 is reflected from a substantially 100% reflective mirror 57A to a substantially 50% reflective/50% transmissive (e.g., silvered) mirror 57B. A portion 61A of the light 52A reflects from the mirror 57B and then impinges on a photosensitive material 62 (e.g., a photographic plate or photopolymer materials, such as those available from DuPont or Polaroid) that is used to record the HOE 30. The light passing through the spatial filter 58 is first directed to pass through a fast (e.g., F/1) collimating lens or collimator 60 spaced at approximately its focal length (f) from the spatial filter 58. This results in approximately collimated light being produced, a portion 61B of which then passes through the mirror 57B and is incident on the photosensitive material 62. The reference and object beams 52A, 52B (i.e., the portions 61A, 61B) will interfere with each other to form a hologram as an interference pattern or fringes in the photosensitive material 62, shown generally as numeral 33 in FIGS. 4–5. Such a pattern results because both the reference beam 52A and the object beam 52B are derived from a substantially coherent source.

Once the HOE 30 is recorded and developed, it is possible to reproduce the reference beam 52A (i.e., the portion 61A) by simply placing the HOE 30 approximately in its original position and introducing only the same or a similar object beam 52B (i.e., the portion 61B). It is also possible to reproduce the object beam 52B by introducing only the same or a similar reference beam 52A. In the present invention, the emphasis will be mainly on the object beam 52B being reproduced by the same or a similar reference beam 52A, although applications involving reproduction of the reference beam 52A by the object beam 52B in other embodiments will be appreciated by those skilled in the art.

For a transmission-type hologram, the introduction of the reference beam will reproduce the object beam, which is transmitted by the recorded hologram. The reproduced, substantially collimated object beam light is directed into, what is termed in the art, the "first" order of diffraction of the reference beam. A portion of the reference beam (approximately 4%) will pass through the hologram in other orders, most significantly in the "zero" order of diffraction of the reference beam.

After recording and developing, the hologram may or may not be baked. Baking is preferable in some embodiments (e.g., if DuPont photopolymer is used), however, as it allows the interference fringes 33 produced by the interfering light to be stabilized (i.e., substantially fixed). After baking, the hologram will perform substantially similarly to its performance before baking. The hologram recorded in such a manner may be used in the screen apparatus 40 in FIG. 5 as the HOE 30 to substantially collimate the image light 32 as the light 35. The image light 32 is introduced to the HOE 30 similarly to the reference beam light in FIG. 6, i.e., at approximately the same angle and divergence.

Although the HOE 30 is initially recorded with substantially coherent laser light of narrow wavelength or color, white light, "quasi"-white light, or other colored light from the image engine 14 will be nearly collimated when introduced in place of the reference beam light used to record the HOE 30. This is true, even though the HOE 30 may exhibit some chromatic dispersion. Quasi-white light, in the context of the present invention, refers to light output from a light source that may be deficient in one or more colors, but, nevertheless, produces substantially white light.

Referring again to FIG. 5, the screen apparatus 40 includes a diffuser or diffusive screen 42 much like the diffuser 12 shown in FIG. 1. The collimated light 35 is focused by the glass bead 17 as light 45 and viewed as an image by the viewer 27 from the image light 45 that passes through the surface 26 after passing through the substrate 24, as described above. The diffuser 42, in the particular embodiment illustrated, is held in spaced apart relation to the HOE 30, spaced by a small air gap 44. The effects of the chromatic dispersion discussed above, that spreads light colors differently, may be minimized by making the air gap 44 as narrow as possible (e.g., on the order of microns) or by eliminating it altogether, as will be appreciated by those skilled in the art. Moreover, the use of a no-beaded screen, such as a bulk diffusing screen, may help avoid or reduce some of these chromatic dispersion effects, as will be discussed below.

The HOE 30 offers distinct advantages over the Fresnel lens 11 in FIG. 1 for collimating the image light. There is no ghost image light or shadowing, such as that produced by the Fresnel lens 11. An air gap, like the air gap 44, is not necessarily required, or may be substantially reduced, depending on screen apparatus design, as will be described below. The HOE 30/diffuser 42 combination may be both flat and flexible. There may be no need to hold the HOE 30 and the diffuser 42 in rigid or semi-rigid spaced apart relation to assure proper operation. Moreover, the HOE 30 may be lighter in weight and cheaper than the typical Fresnel lens 11.

Referring to FIG. 7, a screen apparatus 100 is illustrated in accordance with a second embodiment of the invention. The screen apparatus 100 includes the HOE 30 layered or coated on, bonded or adjacent to, or otherwise suitably applied to, a diffusive screen or diffuser 102. Suitable bonding may be achieved with an index matching optical adhesive or material (not shown) applied between the surface 34 of the HOE 30 and a first surface 104 of the diffuser 102, as will be appreciated by those skilled in the art. The diffuser 102 may be formed of a mixture of any two (or more) appropriate immiscible materials having different indices of refraction. An example of such materials could be two immiscible polymers that have indices of refraction n=1.5 and n'=1.52, respectively. Another possible material for the diffuser 102 includes $TiO_2$ or other like materials that, when dispersed as particles or particulate clusters of appropriate size in polymer materials (e.g., a polymer matrix), such as acrylic or other like materials, can act as image light scatterers. The lighter weight of the immiscible materials will form a distribution of spaced apart globules (not shown) of appropriate size within the higher weight material. Each individual globule will tend to stay together due to surface tension effects. These globules, when incorporated in the diffuser 102, will act as light scatterers for light incident. Commercially available diffusers that may be used for the diffuser 102 are available from Nashua in their "MICROSHARP" technology product line, and other diffusers are available from Minnesota Mining & Manufacturing Company among other manufacturers or suppliers. Many types of such diffusers are known in the art.

In FIG. 7, as before, the imaging light 32 incident on the surface 31 of the HOE 30 is collimated by the HOE 30 on transmission. The collimated light exiting through the surface 34 of the HOE 30 and entering the diffuser 102 through the surface 104 is scattered as it passes through the diffuser 102 as light 108. The effects of chromatic dispersion discussed above should be diminished because there is no air gap or substantially no air gap between the HOE 30 and the diffuser 102 (although a small air gap may be tolerable under certain circumstances in certain embodiments if chromatic dispersion is not too large). The imaging light 108 passes out of the diffuser 102, and the viewer 27, suitably positioned, can see an image from the image light 108 that passes through a surface 106 of the diffuser 102.

The screen apparatus 100, because of the operation of the HOE 30 and the diffuser 102, will provide relative uniformity of the intensity of the imaging light 109 if the viewer moves his or her head transversely while viewing an image on the surface 106. This may be understood by considering FIG. 8, which schematically illustrates polar plots of forward (power) gain profiles or patterns 110A, 110B, 110C for the light 108 (FIG. 7) exiting the diffuser 102 in a region 105. Similar plots could be constructed for the embodiments shown in FIG. 5, which also provides substantially collimated light upon image light passage through the HOE 30. The forward gain profiles 110A, 110B, 110C have their maxima generally centered in a direction substantially normal to the surface 106 of the diffuser 102 due to the image light 108 being substantially collimated by the HOE 30. A maximum 111A of the gain profile 110A is directed toward the viewer 27, who is located substantially in a central (or other) position for viewing the screen apparatus 100, as generally indicated by the arrow 114A in FIG. 8. The gain profiles 110B, 110C correspond to portions of the light 108 that is scattered from areas of the diffuser 102 near edges of the diffuser 102. These gain profiles do not, however, have their gain profile maxima 111B, 111C directed toward the viewer 27 in this position, as generally indicated by the arrows 114D and 114E. Instead, the light 108, directed toward the viewer 27 from the gain profiles 110B, 110C, have below-maxima values 113B, 113C, as generally indicated by the arrows 114B, 114C.

The gain profiles 110A, 110B, and 110C in FIG. 8 can give a sense of how image light intensity can vary as the viewer 27 moves transversely in front of the screen apparatus 100. As the viewer 27 moves in either of directions 112A, 112B, at some point, there will be a noticeable increase in one of the gain profile values 110B, 110C of the image light directed toward the viewer 27, and a noticeable decrease in the other. The value of the gain profile 110A will not, however, change that rapidly. Therefore, over a reasonable transverse distance range at a distance "D" in front of the screen apparatus 100, the intensity will be relatively uniform because of the operation of the HOE 30 and the diffuser 102. The distance D can be in a range that would be typical for viewing a particular device, such as a computer monitor, a large or small television screen, or projection screen, in a setting, such as a room. D will, in general, depend on the size of the room, the size of the screen apparatus, and other factors that bear on the particular application.

FIG. 9, which is similar to FIG. 8, schematically illustrates polar plots of gain profiles 116A, 116B, 116C of scattered image light 158 from a screen apparatus 150 in a region 115. Maxima 117A, 117B, 117C in the gain profiles 116A, 116B, 116C in FIG. 9 are not all forward directed, substantially normal to a viewing surface of the screen apparatus 150. Instead, the maxima in the gain profiles are substantially directed toward a particular (e.g., a central) viewing region or position where the viewer 27 can view an image displayed on the screen apparatus 150. For example, while the gain profile 116A is generally directed along an arrow 120A in the forward direction, the gain profiles 116B, 116C are angularly directed along arrows 120B, 120C, respectively. Gain profile values 119B, 119C for the forward directed image light of the gain profiles 116B, 116C have values further below their respective maxima 117B, 117C compared to the maxima 111B, 111C in FIG. 8. Such gain profiles as 116A, 116B, 116C may be preferable for image viewing and substantially maintaining image light intensity uniformity or illumination uniformity as the viewer 27 moves in transverse directions, i.e., along the directions of arrows 118A, 118B, compared to the gain profiles in FIG. 8. The gain profiles in FIG. 9 can give a sense of maintaining image uniformity better than the gain profiles illustrated in FIG. 8. For example, in FIG. 9, as the viewer 27 moves over a limited range in either of the directions 118A, 118B at a distance "D" from the screen apparatus 150, the variation between the values of the gain profiles 116B, 116C may be less than that between the values of the gain profiles 110B, 110C in FIG. 8. On the other hand, the corresponding variation in the values of the gain profile 116A may be similar to the variation of the values of the gain profile 110A in FIG. 8. The typical viewing distance D' will have analogous dependencies as those of the viewing distance D discussed above. D' will be a function of the specific design involved.

Figure 10:
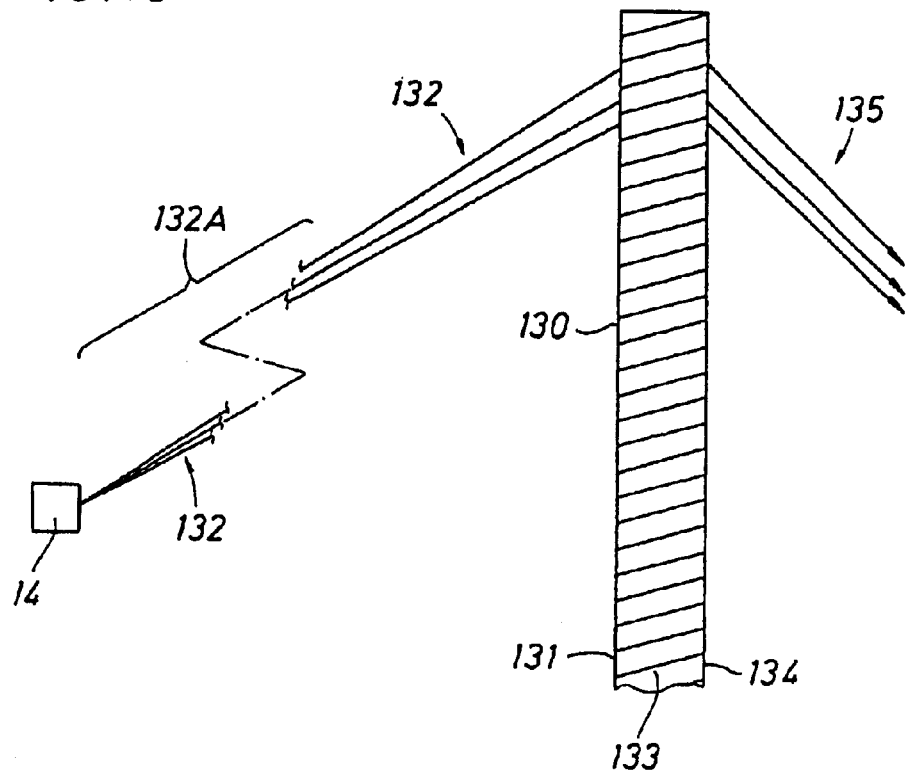
FIG. 10 is a side, cross-sectional view of a holographic optical element converging light in accordance with the embodiment in FIG. 9.
Figure 11:
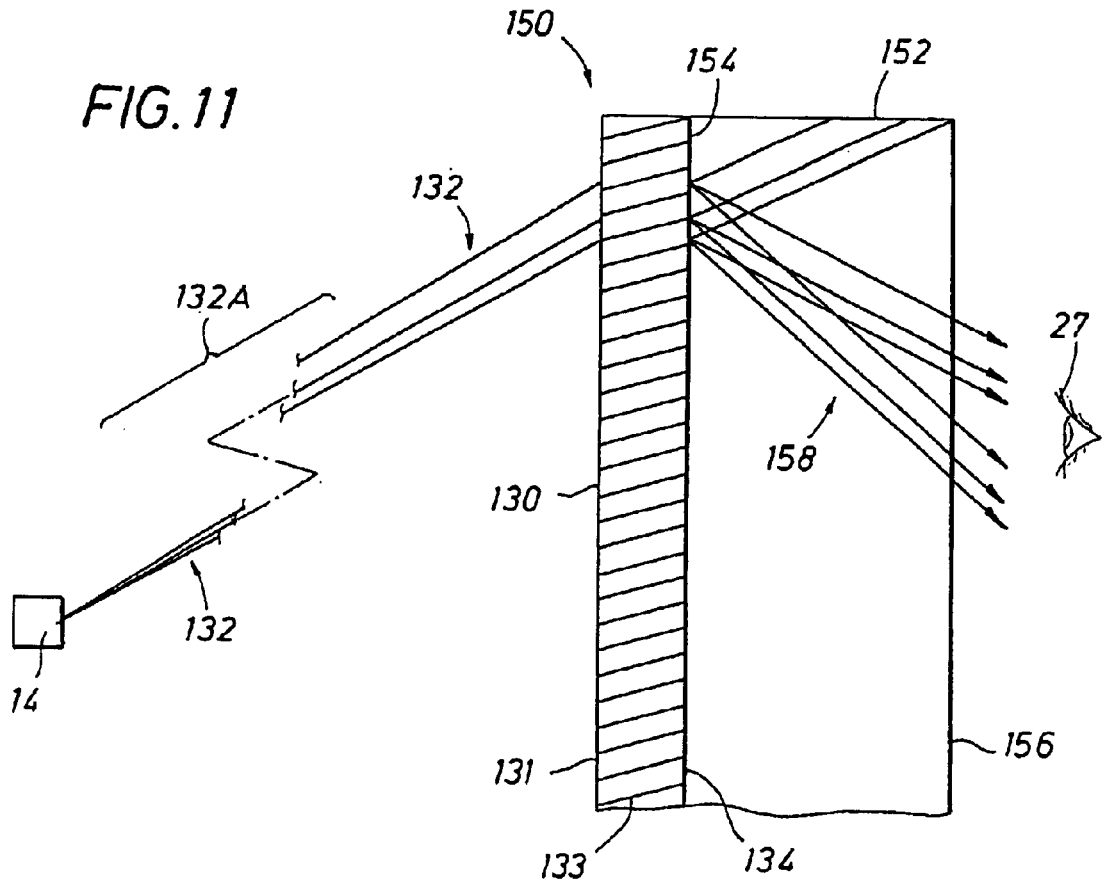
FIG. 11 is a side, cross-sectional view of a screen apparatus in accordance with the embodiment in FIGS. 9 and 10.

Reference is now made to FIGS. 10 and 11 for an implementation of the screen apparatus 150 in accordance with a third embodiment of the invention. As will be appreciated by those of skill in the art of holography, modifications of the optical setup shown in FIG. 6 can be made that make it possible to record a hologram that converges (or diverges in other embodiments) light instead of collimating light. This can be accomplished, for example, by moving the lens 60 relative to the spatial filter 58 and the photosensitive material 62. Once recorded with reference and object beams as interference fringes 133, and then developed and possibly baked, as discussed above, the converging hologram (the remaining discussion will emphasize converging light instead of diverging light) could be repositioned in its original position with respect to the same or a similar reference beam for reproducing the converging object beam. In FIG. 10, such a hologram is shown as an HOE 130, which is positioned to receive image light 132 from the image engine 14. The processing or filtering (e.g., projecting by a projection or other lens, not shown) of the light 132 is generally indicated by a break in the light path and numeral 132A, as similarly discussed above. The light 132 is incident on the HOE 130 through a first surface 131 and exits the HOE 130 through a second surface 134 as converging image light 135.

Referring to FIG. 11, the screen apparatus 150 is shown, which includes the HOE 130 and a diffusive screen or diffuser 152. The screen apparatus 150 is similar to the screen apparatus 100. The HOE 130 and the diffuser 152 are layered, coated, bonded, adjacent, or suitably applied together, as similarly discussed above for the screen apparatus 100 in FIG. 7.

In operation, the incident image light 132 passes through the first surface 131 and exits the second surface 134 of the HOE 130. Upon entering the diffuser 152 (similar to the diffuser 102 described above) through a first surface 154, the light 132 is scattered as image light 158, which exits the diffuser 152 through a second surface 156. The viewer 27, suitably positioned in front of the screen apparatus 150, can see an image produced by the image light 158 at the surface 156. The position of the viewer 27 in FIG. 11 may be as shown in FIG. 9, with the light 158 exhibiting gain profile maxima directed to the viewer 27. The image light 158 in FIG. 11 is shown following paths in a substantially more downward (or centralized) direction compared to the image light 108 in FIG. 7. In FIG. 11, the direction taken by the light 158 would be expected because of the converging property of the HOE 130 compared to the collimating property of the HOE 30, and should lead to substantially more uniform image illumination as the viewer 27 moves transverse to the screen apparatus 150.

It is contemplated that the HOE 130 (or HOE 30) could be suitably designed, using the standard techniques of holography, to direct the image light 158 (or 108) to particular optimized (or optimal) positions or other locations of the viewer 27 in the region 115 in FIG. 9 (or 105 in FIG. 8), as will be appreciated by those skilled in the art. These locations may be the best for viewing high quality images. For example, the screen apparatus could be designed to be suspended from a ceiling in a room and substantially direct its best and most uniform image downward in the room to a viewing audience below, rather than straight out along a normal direction to the screen apparatus.

The screen apparatuses 40, 100, and 150 described above may be advantageously employed in "folded" display apparatuses 200 and 250 shown in FIGS. 12 and 13, respectively, in accordance with fourth and fifth embodiments of the invention. The display apparatuses 200 and 250 may form part of a computer monitor or television display and are similar to projection systems described in prior, co-owned U.S. patent application Ser. No. 08/581,108, filed Dec. 29, 1995, by Richard M. Knox, entitled "Projecting Images" and in European Pat. app. No. 96309443.8, EP078133A1, filed Dec. 23, 1996, by Richard M. Knox et al., entitled "Projecting Images." published Jul. 9, 1997, which are incorporated by reference herein in their entirety. The folded optical paths in the display apparatuses 200 and 250 enables the size of these image projection apparatuses to be reduced compared to other types of display apparatuses. For example, the "footprint" dimensions "L" and "L'" may be made smaller by folding, which reduces the apparent projection lengths in these apparatuses.

Referring to FIG. 12, the display apparatus 200 includes an image engine or projector 202, which may be similar to the image engine 14 described above. The image engine 202 may also be similar to image engines described in the aforementioned U.S. patent application Ser. No. 08/730,818. The image engine outputs image light 204 in response to input signals, for example, electronic, video, or other signals received from an antenna, cable, computer, or controller. The image light 204 reflects off a lower mirror or reflector 206 to a higher mirror or reflector 208. The light 204 is then reflected by the upper mirror or reflector 208 and is directed to an HOE 210. The HOE 210 may be similar to the HOEs 30, 130, depending on the design of the display apparatus 200. The image light exiting the HOE 210 could, therefore, be collimated, converging, or diverging, according to the particular design, as it enters a diffusive screen or diffuser 212, layered or coated on, bonded or adjacent to, or otherwise applied to the HOE 210. The diffuser 212 may be similar to any one of the diffusers 42, 102, or 152, according to the design. The diffuser 212 scatters the image light as light 214, which the viewer 27 can see as forming an image at the diffuser 212 of the display apparatus 200.

Referring to FIG. 13, the display apparatus 250 is shown, which includes an image engine or projector 252, a signal splitter 254, an input cable 256, a sound system 258, a screen apparatus 260, and a back mirror or reflector 262. The image engine 252 may be similar to image engines described above and in the aforementioned U.S. patent application Ser. No. 08/730,818. The screen apparatus 260 includes a polarizing reflector 264, a HOE 266, and a diffusive screen or diffuser 268, which, depending on the specific design, may be layered, coated, bonded (e.g., with index matching adhesive), laminated (e.g., as one element), or otherwise applied together in the order shown in FIG. 13. The polarizing reflector 264, the HOE 266, and the diffuser 268 may be held together in spaced apart relation (some chromatic dispersion will occur if the HOE 266 and the diffuser 768 are spaced apart) or not in spaced apart relation (i.e., substantially with no air gaps). An example of a material that may be used for the polarizing reflector 264 is double brightness enhancement film (DBEF), also called multilayered optical film (MOF), commercially available from Minnesota Mining & Manufacturing Company, or other wide-angle polarizing reflector materials. The polarizing reflector 264 has a characteristic of preferentially reflecting light of a first linear polarization and preferentially transmitting light of a second linear polarization, orthogonal to the first polarization light. Depending on the design of the display apparatus 250, the HOE 266 may be similar to one of the HOEs 30, 130 described above, i.e., a collimating, converging, or diverging HOE. Likewise, depending on the design, the diffuser 268 may be any one of the diffusers 42, 102, or 152 described above.

The back reflector 262 includes a mirror or reflector 270 and an achromatic retarder 272 that, depending on the design, may be layered, coated, bonded (e.g., with index matching adhesive), adjacent or otherwise applied together in the order shown in FIG. 13. The back mirror or reflector 270 and the achromatic retarder 272 may be held together in spaced apart relation or not in spaced apart relation (i.e., substantially with no air gaps). Suitable achromatic retarders may be designed to accommodate a spaced apart arrangement, as will be appreciated by those skilled in the art.

In operating the display apparatus 250, the image engine 252 receives an electronic signal through the input cable 256 and provides the signal to the signal splitter 254. The signal splitter 254 divides the signal into, for example, a video signal and an audio signal, and provides these signals to the image engine 252 and the sound system 258, respectively. The image engine 252 converts the video signal into projected image light 274. The electronic signal received by the cable 256 may be any type of signal containing video information, such as a television signal received by an antenna or over cable lines, or a computer video signal received through a computer video cable. The audio signal and the sound system are optional.

The image light 274 may be polarized in the image engine 252 in a light source thereof (not shown) or by a polarizer (not shown) that may be employed external to the image engine 252 to polarize the image light in the first polarization discussed above. In a first instance, the image light 274 output from the image engine 252 and polarized in the first polarization direction is reflected by the polarizing reflector 264 toward the back reflector 262. The reflected image light 274 passes through the achromatic retarder 272 a first time, is reflected by the back mirror or reflector 270, and passes through the achromatic retarder 272 a second time directed again toward the screen apparatus 260. The achromatic retarder 272 is designed to have an optical thickness (substantially one-quarter wave), such that the double pass of the image light 274 in the first polarization will undergo an effective half-wave polarization shift or rotation of substantially 90 degrees. Thus, the image light 274 now directed toward the screen apparatus will substantially be in the second polarization and will substantially pass through the polarizing reflector 264 to the HOE 266. The HOE 266 collimates, converges, or diverges this light, according to the design, which is subsequently scattered by the diffuser 268 as image light 276. The viewer 27 can then observe an image produced by the image light 276 at the diffuser 268 of the screen apparatus 260, in similarity to the descriptions given above.

A method of making the screen apparatus (e.g., 100, 150 shown in FIGS. 7 and 11) may be set forth in accordance with a sixth embodiment of the invention. The hologram or HOE (e.g., HOEs 30, 130) for the screen apparatus may be formed by the process described above (for forming collimating, converging, or diverging HOEs), including recording in an appropriate optical setup using reference and object beams. The object beam may be produced by a collimating lens, such as the lens 60 in FIG. 6, or, in other embodiments, it may be recorded with the lens 60 or other suitable optics adjusted to produce a converging or diverging object beam to the photosensitive material. Once recorded, the HOE (e.g., 30, 130) is developed and may be baked, as previously described.

The method also includes forming a diffuser (e.g., 102, 152) by mixing, two or more immiscible or particulate materials (e.g., polymers) having different indices of refraction with one of the materials having physical properties sufficient for forming light scatterers within a matrix of the other materials. The diffuser may otherwise be provided as a commercially available diffuser as discussed above. The HOE (e.g., 30, 130) is then suitably mounted to be generally parallel to the diffuser (e.g., 102, 152) for receiving the incoming light (e.g., 32, 132 shown in FIGS. 7 and 11). The mounting process may include lamination as a single element (e.g., with an index matching adhesive or material between the HOE and the diffuser), layering or coating, adjacent placement, or otherwise suitably applying the HOE and the diffuser together. The method contemplates the placement of the HOE (30, 130) and the corresponding diffuser (102, 152) in spaced apart relation with the air gap (not shown) therebetween or not.

In all the embodiments of the invention, as previously described, diffusive viewing screens or beaded screens are included in the screen apparatus. Both types of screens are generically referred to herein as diffusers. The beaded screens capture stray imaging light elements, have a limited acceptance angle, and the stray light is absorbed in a black matrix. The diffusive screen, on the other hand, scatters the stray light so that it may be somewhat homogeneous or uniform in intensity across the viewing screen. The type of diffusive screens include bulk diffusive screens. In other embodiments of the invention, surface diffusers, for example, ground glass and the like, could also be used instead of diffusive screens or beaded screens.

The screen apparatus embodiments of the invention should be designed so that the particular order, for example, the first order of the diffracted light would be the collimated light used for imaging. This would include approximately 95–96%, (could be up to or greater than 99%, or much less of the light diffracted by the holographic optical element into the first order, depending on the type of hologram and/or the cost of making the hologram. The other approximately 4–5% of the light is diffracted into other orders, including the zero order. although if the HOE 30 is a volume hologram, there is (or substantially is) no other relevant order besides the zero order. It is contemplated that the HOE 30, 130 may instead be a reflection-type HOE rather than a transmissive-type HOE, which could be used to provide collimated light in reflection. In applications that require little or no chromatic dispersion, a reflection-type HOE may be desirable because, in certain embodiments, the reflection-type HOE may exhibit substantially little or no chromatic dispersion. The recording and formation of such a reflection-type HOE will be understood and appreciated by those skilled in the art. Once a master reflection-type HOE is made, it may be replicated using standard processes, such as embossing for surface kineform or surface relief HOEs, as can be provided by Polaroid or by using equipment purchased from DuPont. The screen apparatus embodiments should also be designed to prevent a hot spot from occurring on the screen, as discussed above. This could potentially lead to contrast problems otherwise, for example, screen corners darker than in the screen center, or having a peak of the imaging light intensity occur off-access as viewed on the screen apparatus. Appropriate design of the HOE 30, 130 and the corresponding diffuser 42, 102, 152 in combination should assure more uniform illumination and avoid a hot spot, as the image light can be turned (e.g., collimated, converged or diverged) to avoid or substantially reduce oblique screen illumination.

The particular embodiments disclosed above are illustrative only, as the invention may be modified and practiced in different but equivalent manners apparent to those skilled in the art having the benefit of the teachings herein. For example, the HOEs described herein could instead be reflection-type HOEs, as discussed above, suitably designed to work in analogous fashion with diffusers, but in reflection-based screen apparatuses or displays. Moreover, image generation devices of the type (e.g., that include one or more cathode ray tubes or CRTs for forming an image) described in U.S. Pat. No. 5,557,343, issued to Yamagishi, entitled "Optical System Including A Reflecting Polarizer For A Rear Projection Picture Display Apparatus," incorporated by reference herein in its entirety could be used as the image engine 14 and are intended to be included within the scope of the present invention. Other types of image generation devices known in the art could be used as the image engine 14 and are intended to be included within the scope of the present invention, as well. Furthermore, no limitations are intended to the details of construction or design shown herein, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A display apparatus, comprising:
   a holographic optical element adapted to receive image light and to redirect the image light; and
   a diffuser adapted to receive the redirected image light from the holographic optical element and to scatter the redirected image light, wherein the holographic optical element and the diffuser are disposed adjacent to one another with a gap therebetween that is substantially minimized for reducing effects of chromatic dispersion.

2. The display apparatus of claim 1, wherein the holographic optical element and the diffuser are adapted to provide a substantially uniformly illuminated viewing region.

3. The display apparatus of claim 2, wherein the viewing region comprises an optimized viewing position.

4. The display apparatus of claim 1, wherein the holographic optical element is adapted to substantially collimate the image light.

5. The display apparatus of claim 1, wherein the holographic optical element is adapted to substantially converge the image light.

6. The display apparatus of claim 1, wherein the diffuser comprises two or more immiscible materials.

7. The display apparatus of claim 1, wherein the holographic optical element and the diffuser are disposed adjacent to one another with substantially no air gap therebetween.

8. The display apparatus of claim 1, further comprising an index matching material disposed between the holographic optical element and the diffuser.

9. The display apparatus of claim 1, wherein the holographic optical element and the diffuser are adapted to provide gain profiles of image light substantially directed toward a viewer.

10. The display apparatus of claim 1, wherein the diffuser focuses the redirected image light as it passes through the diffuser.

11. The display apparatus of claim 1, further comprising an image source adapted to provide image light to the holographic optical element, wherein the image light comprises substantially white light.

12. The display apparatus of claim 1, wherein the holographic optical element and the diffuser are comprised in a folded optical system.

13. The display apparatus of claim 1, further comprising:
   a display surface; and
   a projection apparatus for producing an image on the display surface, the projection apparatus comprising:
     an image engine;
     an optical device; and
     means for transmitting light from the image engine to the display surface such that the light travels an image path which reaches the optical device twice on its way to the display surface for reflecting light from the display surface at one instance, and for passing through the display surface at another instance, wherein the optical element is reflective of some light and transmissive of other light.

14. The display apparatus of claim 1, wherein the holographic optical element and the diffuser comprise a flexible combination.

15. The display apparatus of claim 1, wherein the holographic optical element and the diffuser comprise a laminated element.

16. The display apparatus of claim 1, wherein the holographic optical element comprises a transmission-type holographic optical element.

17. The display apparatus of claim 1, wherein the holographic optical element comprises a reflection-type holographic element.

18. The display apparatus of claim 1, wherein the holographic optical element comprises a photopolymer material.

19. The display apparatus of claim 1, wherein the holographic optical element and the diffuser are adapted to provide the redirected image light predominantly to a particular viewing position.

20. The display apparatus of claim 1, wherein the gap is on the order of microns.

21. The display apparatus of claim 1, wherein the holographic optical element and the diffuser are formed as layers, coatings, or are bonded to one another.

22. The display apparatus of claim 1, wherein the diffuser is a non-holographic diffuser.

23. The display apparatus of claim 1, further comprising:
a display surface;
a projection apparatus configured to produce an image to be displayed on the display surface; and
at least one reflector, wherein the image to be displayed is reflected off of the at least one reflector before passing through the holographic optical element and the diffuser.

24. The display apparatus of claim 23, wherein the at least one reflector comprises at least two reflectors and wherein the image to be displayed is reflected off of the at least two reflectors before passing through the holographic optic element and the diffuser.

25. The display apparatus of claim 23, further comprising:
an optical device, wherein an image to be displayed reaches the optical device twice on its way to the display surface.

26. The display apparatus of claim 25, wherein the optical device is a reflecting polarizer.

27. The display apparatus of claim 25, wherein the image to be displayed passes through the optical device prior to passing through the holographic optical element and the diffuser.

28. The display apparatus of claim 25, further comprising:
a reflector, wherein at least a portion of the image to be displayed first reaches the optical device and is reflected therefrom, reaches the reflector and is reflected therefrom, and then reaches the optical device again and passes therethrough.

29. The display apparatus of claim 28, further comprising a polarizer disposed between the reflector and the optical device.

30. The display apparatus of claim 1, further comprising:
a display surface optically coupled to the diffuser, the display surface and the diffuser collectively forming a display screen; and
folded optics adapted to receive image light from an imager, wherein the holographic optical element receives image light from the folded optics and redirects the image light to the display screen.

31. The display apparatus of claim 30, wherein the display screen comprises a beaded screen.

32. The display apparatus of claim 31, wherein the beaded screen comprises a black matrix.

33. The display apparatus of claim 30, wherein the folded optics, the holographic optical element, and the display screen are configured as part of a television display or a computer display.

34. The display apparatus of claim 33, wherein the diffusive screen comprises a bulk diffusive screen.

35. The display apparatus of claim 33, wherein the diffusive screen comprises surface diffusers.

36. The display apparatus of claim 35, wherein the surface diffusers comprise ground glass.

37. The display apparatus of claim 30, wherein the folded optics, the holographic optical element, and the display screen are comprised in a rear projection system.

38. The display apparatus of claim 30, wherein the folded optics, the holographic optical element, and the display screen are comprised in a front projection system.

39. The display apparatus of claim 30, wherein the display screen comprises a diffusive screen.

40. The display apparatus of claim 30, wherein the folded optics comprises a polarizing reflector positioned adjacent the holographic optical element.

41. The display apparatus of claim 40, wherein the polarizing reflector comprises double brightness enhancement film (DBEF).

42. The display apparatus of claim 30, wherein the folded optics comprises a back reflector disposed between the holographic optical element and the imager.

43. The display apparatus of claim 42, wherein the back reflector comprises a mirror and a polarizer.

44. The display apparatus of claim 30, wherein the imager comprises a liquid crystal display imager, a light source, and the projection lens and produces image light in response to input electronic, video, or other signals.

45. A television, comprising:
a holographic optical element adapted to receive image light and to redirect the image light; and
a diffuser adapted to receive the redirected image light from the holographic optical element and to scatter the redirected image light, wherein the holographic optical element and the diffuser are disposed adjacent to one another with a gap therebetween that is substantially minimized for reducing effects of chromatic dispersion.

46. A computer display, comprising:
a holographic optical element adapted to receive image light and to redirect the image light; and
a diffuser adapted to receive the redirected image light from the holographic optical element and to scatter the redirected image light, wherein the holographic optical element and the diffuser are disposed adjacent to one another with a gap therebetween that is substantially minimized for reducing effects of chromatic dispersion.

47. A display apparatus, comprising
folded optics adapted to receive image light from an imager;
a holographic optical element adapted to receive the image light from the folded optics and to redirect the image light; and
a display screen comprising a non-holographic diffuser adapted to receive the redirected image light from the holographic optical element and to scatter the redirected image light.

48. The display apparatus of claim 47, wherein the beaded screen comprises a beaded screen.

49. The display apparatus of claim 47, wherein the beaded screen comprises a black matrix.

50. The display apparatus of claim 47, wherein the folded optics, the holographic optical element, and the display screen are configured as part of a television display or a computer display.

51. The display apparatus of claim 47, wherein the folded optics, the holographic optical element, and the display screen are comprised in a rear projection system.

52. The display apparatus of claim 47, wherein the folded optics, the holographic optical element, and the display screen are comprised in a front projection system.

53. The display apparatus of claim 47, wherein the display screen comprises a bulk diffusive screen.

54. The display apparatus of claim 47, wherein the display screen comprises a diffusive screen comprising surface diffusers.

55. The display apparatus of claim 54, wherein the surface diffusers comprise ground glass.

56. The display apparatus of claim 47, wherein the folded optics comprises a polarizing reflector positioned adjacent the holographic optical element.

57. The display apparatus of claim 56, wherein the polarizing reflector comprises double brightness enhancement film (DBEF).

58. The display apparatus of claim 47, wherein the folded optics comprises a back reflector disposed between the holographic optical element and the imager.

59. The display apparatus of claim 58, wherein the back reflector comprises a mirror and a polarizer.

60. The display apparatus of claim 47, wherein the imager comprises a liquid crystal display imager, a light source, and the projection lens and produces image light in response to input electronic, video, or other signals.

61. A display apparatus, comprising:
folded optics adapted to receive image light from an imager;
a holographic optical element adapted to the receive the image light from the folded optics and to redirect the image light in a non-collimated form; and
a display screen comprising a diffuser adapted to receive the redirected image light from the holographic optical element and to scatter the redirected image light.

62. The display apparatus of claim 61, wherein the display screen comprises a beaded screen.

63. The display apparatus of claim 62, wherein the beaded screen comprises a black matrix.

64. The display apparatus of claim 61, wherein the folded optics, the holographic optical element, and the display screen are configured as part of a television display or a computer display.

65. The display apparatus of claim 61, wherein the folded optics, the holographic optical element, and the display screen are comprised in a rear projection system.

66. The display apparatus of claim 61, wherein the folded optics, the holographic optical element, and the display screen are comprised in a front projection system.

67. The display apparatus of claim 61, wherein the display screen comprises a bulk diffusive screen.

68. The display apparatus of claim 61, wherein the display screen comprises a diffusive screen comprising surface diffusers.

69. The display apparatus of claim 68, wherein the surface diffusers comprise ground glass.

70. The display apparatus of claim 61, wherein the folded optics comprises a polarizing reflector positioned adjacent the holographic optical element.

71. The display apparatus of claim 70, wherein the polarizing reflector comprises double brightness enhancement film (DBEF).

72. The display apparatus of claim 61, wherein the folded optics comprises a back reflector disposed between the holographic optical element and the imager.

73. The display apparatus of claim 72, wherein the back reflector comprises a mirror and a polarizer.

74. The display apparatus of claim 61, wherein the imager comprises a liquid crystal display imager, a light source, and the projection lens and produces image light in response to input electronic, video, or other signals.

75. A display apparatus, comprising:
a holographic optical element adapted to received image light and to redirect the image light; and
a diffuser adapted to receive the redirected image light from the holographic optical element and to scatter the redirected image light; and
a display surface optically coupled to the diffuser, wherein the holographic optical element and diffuser are configured to control a viewer eyebox of the display apparatus.

76. The display apparatus of claim 75, wherein the wherein the holographic optical element and diffuser are configured to provide relative uniformity of intensity of the image light if a viewer moves his or her head transversely while viewing an image on the display surface.

77. The display apparatus of claim 75, wherein the holographic optical element and diffuser are configured to provide the image light in forward extending gain profiles that have their maxima centered in a direction substantially normal to the display surface.

78. The display apparatus of claim 75, wherein the holographic optical element and diffuser are configured to provide the image light in forward extending gain profiles that have their maxima angularly directed toward a particular viewing position.

* * * * *